United States Patent [19]

Simone

[11] Patent Number: 5,019,927
[45] Date of Patent: May 28, 1991

[54] ROTARY CASSETTE CAROUSEL

[75] Inventor: Raymond J. Simone, St. Louis County, Mo.

[73] Assignee: Automation Equipment Co., Fenton, Mo.

[21] Appl. No.: 441,248

[22] Filed: Nov. 27, 1989

Related U.S. Application Data

[62] Division of Ser. No. 172,711, Mar. 24, 1988, Pat. No. 4,907,889.

[51] Int. Cl.⁵ ............................................. G11B 15/675
[52] U.S. Cl. ...................................................... 360/92
[58] Field of Search ........................................... 360/92

[56] References Cited

U.S. PATENT DOCUMENTS 4,271,440 6/1981 Jenkins et al. ......................... 360/92
4,275,425 6/1981 Watanaba et al. ..................... 360/92

Primary Examiner—Robert S. Tupper
Attorney, Agent, or Firm—Polster, Polster and Lucchesi

[57] ABSTRACT

A retrieval and sequencing system, preferably in the form of a tape cassette library is disclosed for automatically playing magnetic tape cassettes, such as video cassettes in regular television programming as well as spot broadcasting. The system includes a rotary cassette carousel for supporting, guiding and releasably receiving cassettes of the same or different size within cassette pockets. A multi-axis cassette transfer robot with a multi-axis cassette arm and associated gripper elements operates to automatically select and transfer cassettes from the rotary cassette carousel to a video cassette machine for playing or recording on cassettes, all of which are controlled and operated by a computer based programmable control system. One cassette is carried by one of the cassette gripper elements for loading into a video tape machine. The other cassette gripper element is used to remove a cassette from a video tape machine so as to allow the loaded cassette gripper element to then insert a cassette into an empty video cassette machine. The loading and unloading of the video cassette machine takes place in the immediate area of the video cassette machine, thus minimizing the time required for changeover and maximizing the time the video cassette machine can operate. The unloaded cassette is then inserted into the rotary cassette carousel into its assigned position. A mobile cassette storage rack may also be used with the aforementioned equipment to enhance up-dating of the rotary cassette carousel. A separate cassette loading port is included to allow for last minute cassette insertions into the system. The entire system is sufficiently flexible and adaptable to accommodate one or more rotary cassette carousels, mobile cassette storage racks, and video cassette playing machines.

17 Claims, 8 Drawing Sheets

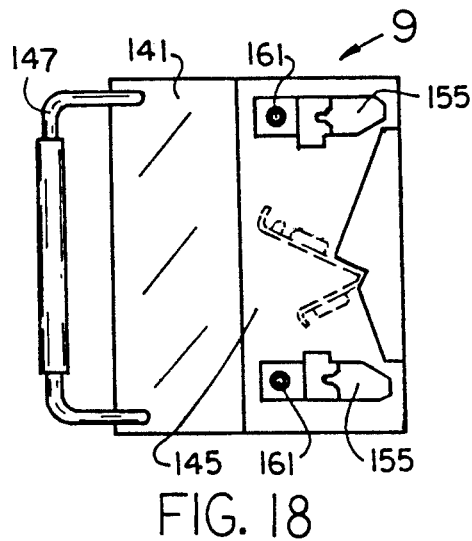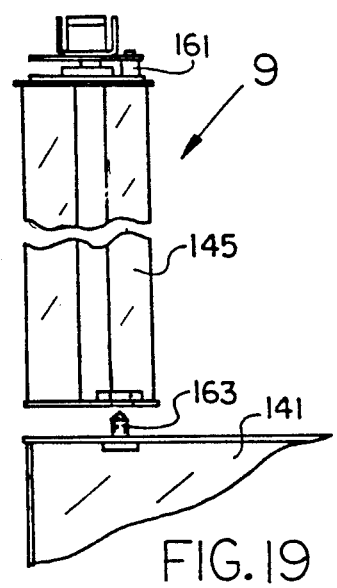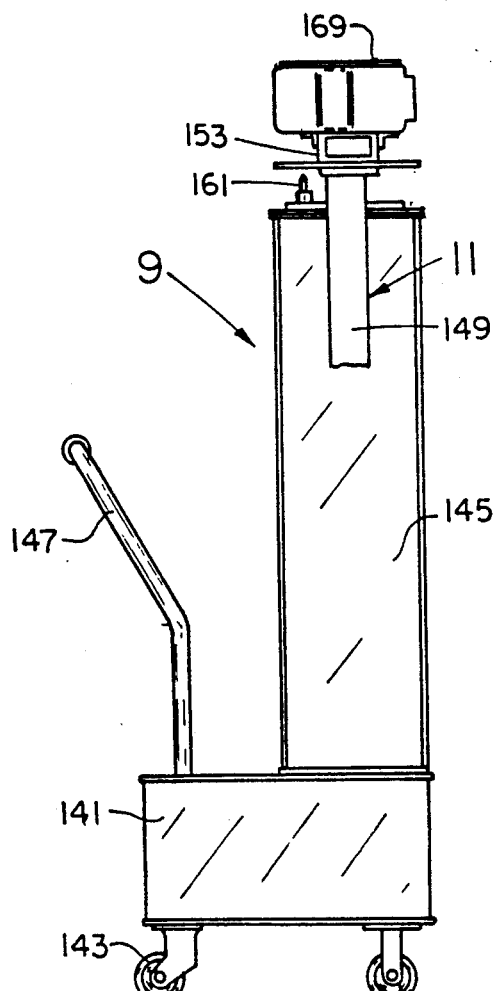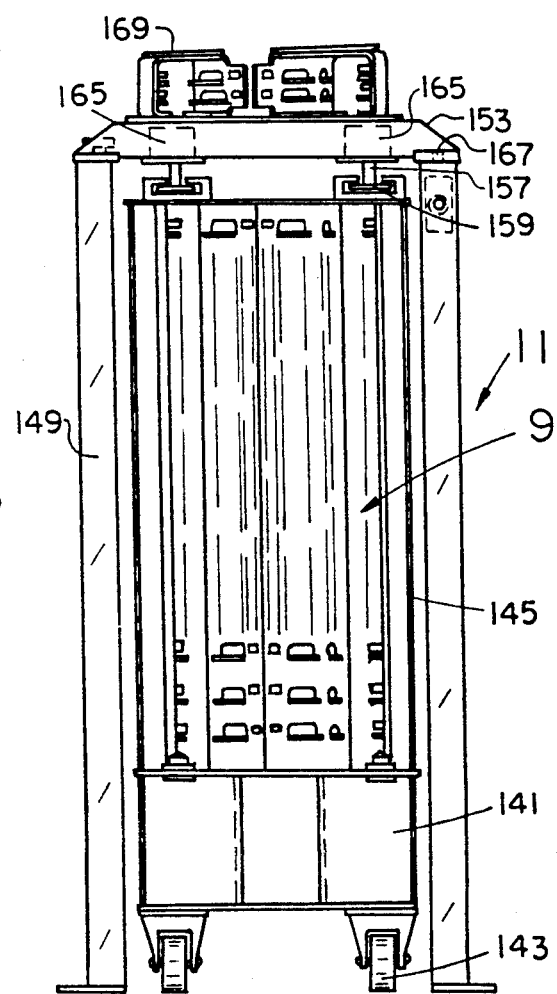

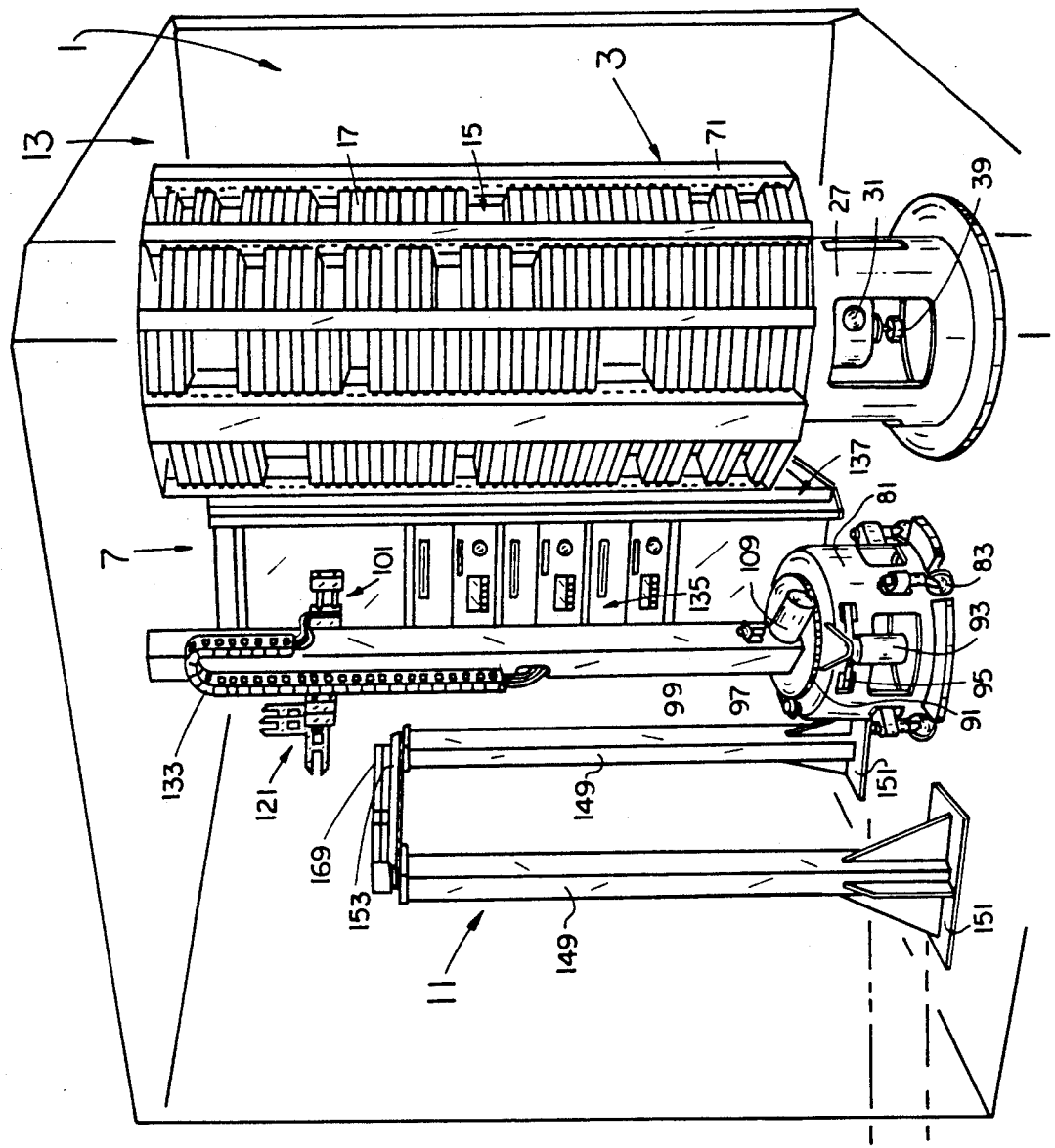
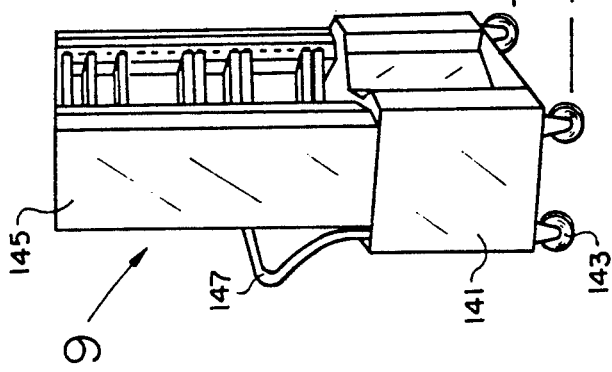
FIG. 20

ROTARY CASSETTE CAROUSEL

This is a divisional of copending U.S. application Ser. No. 172,711, filed on Mar. 24, 1988; now U.S. Pat. No. 4,907,889.

BACKGROUND OF THE INVENTION

The present invention relates to an automatic retrieval and sequencing system, and more particularly, to a magnetic tape cassette library, retrieval and sequencing system for the automatic storage, transfer, sequencing and playback of video cassettes. While the invention is described in particular with respect to such cassette systems, those skilled in the art will recognize the wider applicability of the invention described hereinafter.

Television studios broadcast regular programming formats as well as a variety of short video messages or spots during commercial breaks. For this purpose, multiple video-tape playback machines are used to play the video-tapes in the sequence desired. With respect to spot broadcasting, for example, after each commercial break, some or all of the machines must be re-loaded with new cassettes for playback later during a subsequent commercial break. This requires constant monitoring of the equipment. Not only must the operator search for and locate the desired cassettes, but the cassettes must be located for playback in the desired sequence, as well as being unloaded and stored for subsequent use.

Recent efforts have been made seeking to automate at least some of the systematic procedures required in video tape sequencing used for spot broadcasting. In addition to previously developed automated video spot players, various types of cassette or cartridge conveying mechanisms which transport cassettes between a moving carousel and video playback machines have recently been developed. Unfortunately, some of the systems are limited because they require custom cartridges, and further because the number of cassette carried by the carousels or other types of storage bins have also been limited. In some of these machines, only between fifteen to twenty-five cartridges can be carried on a moving carousel, and in other systems, up to forty video cassettes have been carried in a single column or storage bin. Some developments have even included columns of storage bins and the use of standard video cassettes, in which computer controlled mechanisms locate the cassette and transport cassettes from the storage bins to video tape playback machines.

More recent developments have included an automatic cassette handling and sequencing system which has automated the sequencing procedures to an even greater degree. Thus, as shown in U.S. Pat. No. 4,654,727, a computer controlled system includes cassettes which are loaded into storage bins, the location of a desired cassette in the bin is sensed by a bar coded reader, a cassette manipulator mechanism is activated to move the cassette from the storage bin to a video tape playback head, and the video tapes are played on a separately located machine, in the sequencing desired. The cassette manipulator mechanism is mounted internally within a circumferentially disposed array of storage bins to allow for the sensing, loading, and transport of cassettes to a video cassette playback head. Openings are provided in the circumferentially disposed array of storage bins to enable selected cassettes to be transported to the video tape playback head, as well as to allow entry and removal of inserted/removed cassettes through the access openings in the circumferentially disposed array of storage bins. While the aforementioned automatic cassette handling and sequencing systems have sought to provide automatic handling of cassettes for regular or spot broadcasting purposes without the need for an operator, there are still numerous drawbacks in the systems developed to date. These drawbacks include the speed of operation of the system to meet regular and "spot" broadcasting demands; the flexibility of the system to accommodate changes in the program format; the adaptability of the system to different to types and sizes of cassettes and video cassette playback machines; the flexibility of the system to handle the latest cassette playback machines where two different sizes of cassettes may be inserted in a random fashion; the efficiency and operation of the cassette transporting and loading/unloading operations; and various other reasons which have inhibited the widespread adoption and use of such systems.

SUMMARY OF THE INVENTION

Among the several objects and features of this invention may be noted by:

The provision of a new and improved automatic, retrieval and sequencing system, and more particularly, a system applied to magnetic tape cassettes, such as video cassettes which are automatically sequenced and played, for example, for regular television and "spot" broadcasting purposes;

The provision of a system which provides for the high speed, efficient and effective storage, transfer, sequencing and playback of magnetic tape cassettes;

The provision of a system which utilizes a computer based programmable control system that eliminates the need for an operator during normal operation, except in the role of an equipment monitor or to make on-site changes in the regular or "spot" broadcasting format;

The provision of a system which employs a computer controlled multi-axis robot with a multi-axis cassette transfer arm for accurate and high speed loading/unloading of cassettes relative to a rotary cassette carousel and the insertion/removal of cassettes into, for example video cassette playback machines;

The provision of a system which is adaptable for use with a variety of different sizes and types of cassettes and cassette playback machines, including the alternating and repetitive use of different cassettes in the same or different machines, without affecting the operation of the system;

The provision of a system which employs a rotary cassette carousel that supports, guides and releasably retains cassettes mounted within cassette pockets, while facilitating withdrawal of cassettes therefrom when the rotary cassette carousel is rotated to a desired position, in order to permit removal of a specific cassette from the rotary cassette carousel;

The provision of a system which includes a mobile cassette storage rack that can be locked into and/or removed from the system, without disturbing the normal operation of the system, for up-dating the rotary cassette carousel;

The provision of a system which can be adapted and varied to meet numerous arrangements to satisfy specific and changing needs, including the size of the rotary cassette carousel library and mobile cassette storage racks, as well as being operated within a self-contained stable environment enclosure; and The provision of such a system which enjoys the benefits of a computer based programmable control system, while being designed with simplicity, low maintenance, and "user friendly" features in mind.

Briefly stated, the retrieval and sequencing system of the present invention includes at least one cassette carousel having a plurality of receptacles arranged in a series of vertical columns and horizontal rows. A multi-axis transfer robot includes a multi-axis transfer arm and a pair or associated gripper elements. Each of the gripper elements are at least partially independently operable from each other and from the multi-axis robot. In the preferred embodiment, the system is adopted for use as a video cassette storage medium. As so configured, the system further includes at least one video cassette playback machine for playing cassettes inserted therein and control means for operating the aforementioned components to transfer cassettes from the carousel to the at least one video cassette playback machine through the robot and cassette transfer arms.

In addition to the above, the present invention includes a multi-axis cassette transfer robot having a base, a column extending upwardly from the base and being rotatably mounted thereon. A cassette transfer carriage is mounted for movement in a vertical path on the column and is also provided with a cassette transfer arm which is mounted for movement among a horizontal path. Cassette gripper elements are angularly offset from one another and are mounted on the cassette transfer arm for rotary movement along a predetermined arcuate path. The cassette gripper elements include independently operable cassette gripper means for gripping cassettes when positioned in proximity thereto. The independently operable cassette gripper means include gripper jaws and gripper fingers providing limited extension and gripping motions and corresponding retraction and opening motions for gripping and releasing the cassettes.

As a further aspect of the present invention, a rotary cassette carousel having a plurality of cassette receptacle pockets arranged in a series of vertical columns and horizontal rows is provided. Each cassette pocket includes guiding, supporting and releasably retention means for cassettes mounted therein. Drive means rotates the carousel, and control means start and stop the carousel at desired predetermined locations in order to present a cassette in a specific cassette location for removal from its cassette pocket. The cassette pockets are formed by cooperating and opposed generally vertically directed strut members having the aforementioned guiding, supporting and releasably retention means. The structural members of the carousel can be configured in a plurality of arrangements which permit the storage of a variety of objects having various dimensions.

The present invention further provides a mobile cassette storage rack for use with a fixed rack station in the system. The mobile cassette storage rack includes a cart having wheels for mobile positioning and a cassette storage rack superimposed on the cart and having a plurality of cassette pockets for receiving cassettes. The cassette storage rack and fixed rack station have complementary interfitting connections for assembling the cassette storage rack cart to the fixed rack station, in order to accurately position the cassette storage rack in a predetermined fixed location relative to the fixed rack station.

Other objects and features of the present invention will become apparent from the description that follows.

BRIEF DESCRIPTION OF THE DRAWINGS

In the drawings.

FIG. 16 is a fragmentary side elevational view of a mobile cassette storage rack and fixed rack station which may be employed in the video cassette library, retrieval and sequencing system of the present, invention;

FIG. 17 is an end elevational view of the mobile cassette storage rack and fixed rack station;

FIG. 18 is a top plan view of a mobile cassette storage rack prior to being mounted in the fixed rack station;

FIG. 19 is a fragmentary end elevational view showing the mobile cassette storage rack in clamped position in the fixed rack station; and FIG. 20 is an isometric view illustrating the manner in which the mobile cassette storage rack is moved and positioned relative to the fixed rack station in the video cassette library, retrieval and sequencing system of the present invention.

Corresponding reference characters indicate corresponding parts throughout the several views of the drawings.

DESCRIPTION OF THE PREFERRED EMBODIMENT

Figure 1:
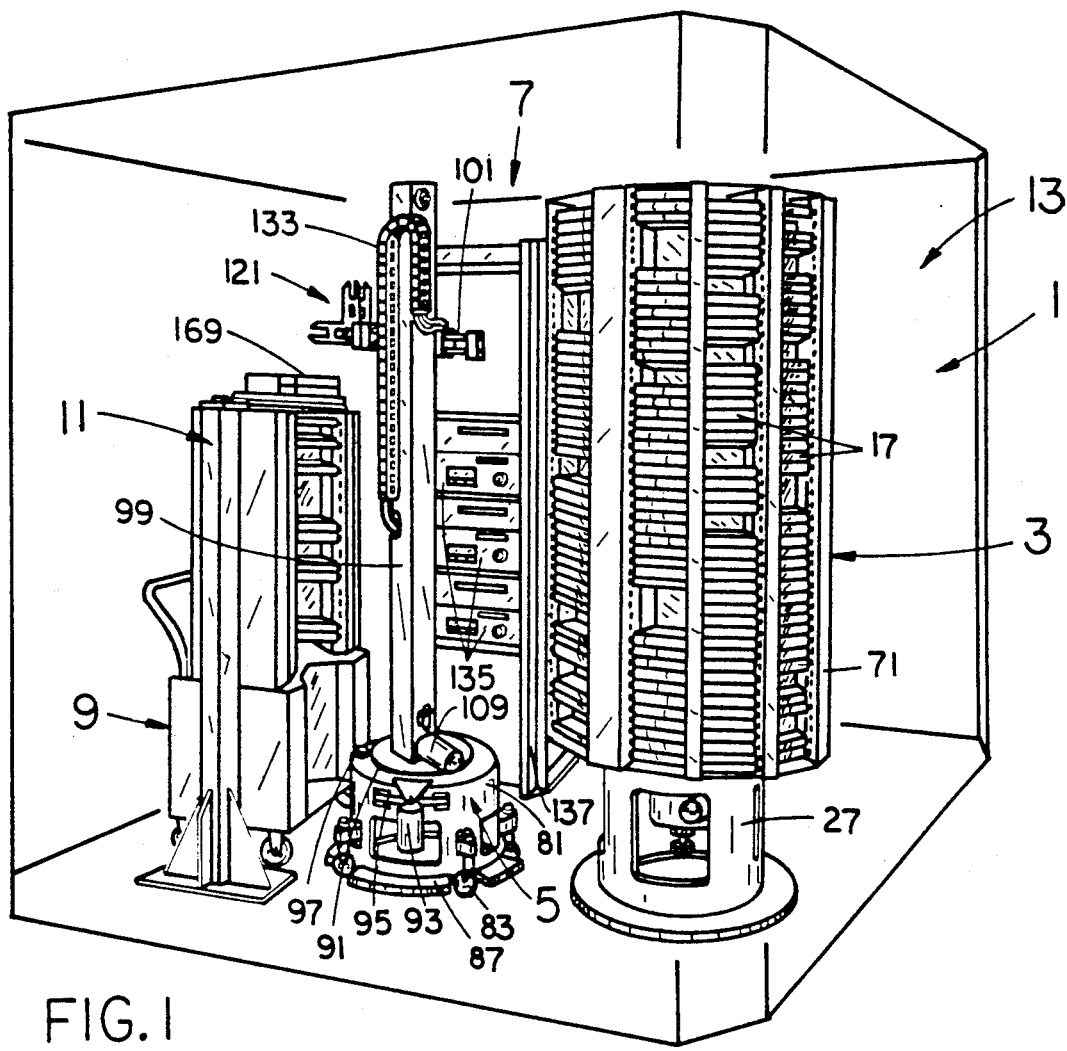
FIG. 1 is an isometric view showing one illustrative embodiment of retrieval and sequencing system of this invention.

Referring now to the drawings, reference numeral 1 indicates one illustrative embodiment of retrieval and storage system 1 of the present invention. In the embodiment illustrating the system 1 is a computer based programmable system for automatically storing, transferring, sequencing and playback of magnetic tape cassettes. Magnetic tape cassettes may include any data or information stored on magnetic tape, including audio and/or video data/information. In the description that follows, the present invention will be described in connection with video tape cassettes, although any type of magnetic tape cassette may be used in the system 1.

Those skilled in the art will recognize the wider applicability of inventive principles discussed hereinafter. The system 1 includes at least one rotary cassette carousel 3 which carries cassettes in a plurality of pre-selected positions, a multi-axis cassette transfer robot 5, at least one video cassette playback machine 7 and control means (not shown) in the form of a computer based programmable control system which operates the aforementioned components to transfer cassettes from the rotary cassette carousel 3 to the at least one video cassette machine 7 through the multi-axis cassette transfer robot 5. An optional component to the system 1 includes a mobile cassette storage rack 9 which may be positioned in a predetermined and fixed location relative to the fixed rack station 11, for use in the system 1. The mobile cassette storage rack 9 may be used where it is necessary to up-date the rotary cassette carousel 3 with new cassettes in order to up-date the program format.

While the specific construction and operation of the aforementioned components in the video cassette library, retrieval and sequencing system 1 will be specifically described hereafter, it will be understood that the computer based programmable control system (not shown) for operating the video cassette library, retrieval and sequencing system 1 is programmed with all the data necessary to preform the necessary movement and interaction between the components. The system computer also stores and continuously updates the location of all cassettes in the system 1. A host (main) computer (also not shown) is coupled to the system computer, with instructions as to the location of specific cassettes and giving the commands necessary to introduce specific cassettes into the system 1 at the desired time. A bar code label or other similar indicia may be used to identify cassettes with corresponding sensors mounted on the robot 5. This information may be stored in the system computer for transmittal to the host computer, in order to operate the video cassette library, retrieval and sequencing system 1, as will be appreciated.

Figure 2:
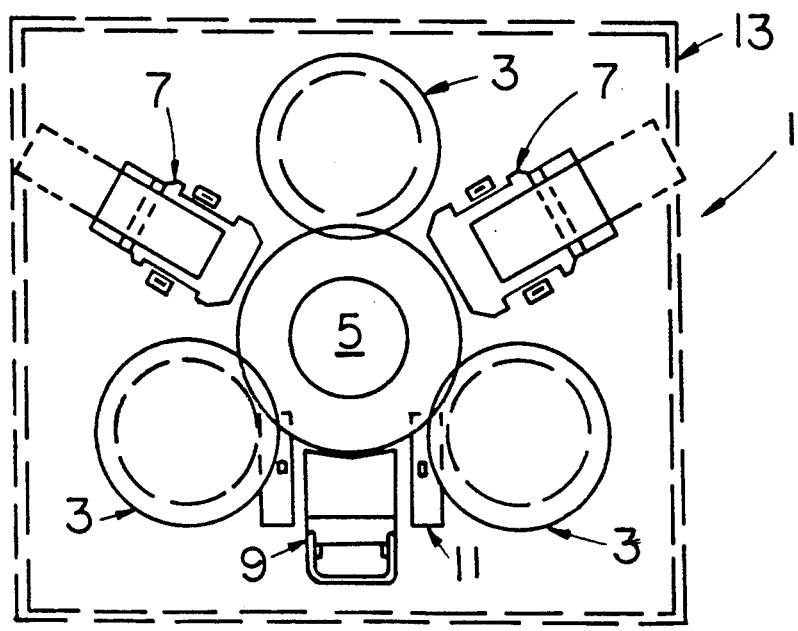
FIG. 2 is a diagrammatic top plan view showing another system arrangement as an example of a variety of arrangements that may be employed to meet the needs and desires of the users of the system of the present invention.
Figure 4:
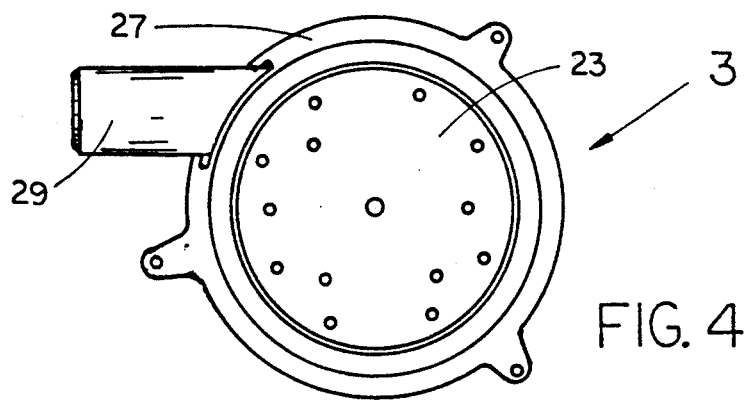
FIG. 4 is a top plan view of the rotary cassette carousel as viewed along Lines 4—4 of FIG. 3.

As shown in FIGS. 1-2 of the drawings, the system 1 may be optionally contained within a protected enclosure 13 which extends around an above the system 1. Where the enclosure 13 is used, a stable air environment for operating the system 1 is provided. The protective enclosure may include a plurality of panel sections connected together to form the walls and ceiling of the enclosure 13, with suitable windows and doors as may be desired.

FIG. 2 of the drawings also shows the flexibility and adaptability of the video cassette library, retrieval and sequencing system 1 to meet various arrangements to satisfy specific and changing needs in television broadcasting, for example. While the basic arrangement shown in FIG. 1 illustrates at least one rotary cassette carousel 3, a multi-axis cassette transfer robot 5 and at least one video cassette machine 7, the arrangement in FIG. 2 of the drawings illustrates other possible arrangements. Specifically, FIG. 2 of the drawings shows three rotary cassette carousels 3 circumferentially equidistantly disposed about the multi-axis cassette transfer robot 5 with two video cassette machine stations 7 and one mobile cassette storage rack 9 with associated fixed rack station 11 all of which are interposed between the three rotary cassette carousels 3, as shown in FIG. 2. As will be appreciated, many other arrangements are possible, depending upon the needs and changes that may occur in the television broadcasting industry. In order to fully understand the construction and operation of the system 1, the description of the principal components and equipment 1 as applied to cassette library, retrieval and sequencing is set forth in detail.

Referring first to the rotary cassette carousel 3, attention is directed to FIGS. 3-8 of the drawings. Each rotary cassette carousel 3 is provided with a plurality of cassette pockets 15 (see FIG. 5) which are arranged in a series of vertical columns and horizontal rows for receiving cassettes 17 (see FIG. 1) inserted into the cassette pocket 15. Each of the cassette pockets 15 have an open mouth 19 which is circumferentially disposed around the rotary cassette carousel 3 for receiving a cassette 17 within each cassette pockets 15. As will be described in detail below, the cassette pockets 15 are formed by cooperating and opposed generally vertically directed strut members 21 which guide, support and releasably retain the cassettes 17 within the cassette pockets 15.

In each rotary cassette carousel 3, the vertically directed strut members 21 are mounted and supported on a rotating drive plate 23 which is supported by the crossed roller bearing 25 at the upper end of the fixed supporting base 27. The single crossed roller bearing provides zero clearance with anti-friction rotation. The drive system for driving the rotating drive plate 23 includes a direct current servo motor 29 which is attached to the supporting base 27, and is coupled to an anti-backlash right angle speed reducer 31. The speed reducer 31 is supported to the supporting base frame 27 by the arm 33. A hollow output shaft (not shown) extends upwardly from the speed reducer 31 and receives the drive plate shaft 35 therein. The hollow output reducer shaft (not shown) is connected to the drive plate drive shaft 35 by an expanding draw pin 37 which provides a zero clearance between these drive shafts, but also affords quick disconnection of these drive shafts. An angular position sensor 39 is connected to and suspended from the shaft extension that depends from the speed reducer 31 and is restrained from rotation by the torque arm extension 41. A single position sensor (not shown) is mounted to the base frame 27 and cooperates with the angular position sensor 39 to establish an angular reference location for the drive shafts of the rotary carousel 3.

Figure 3:
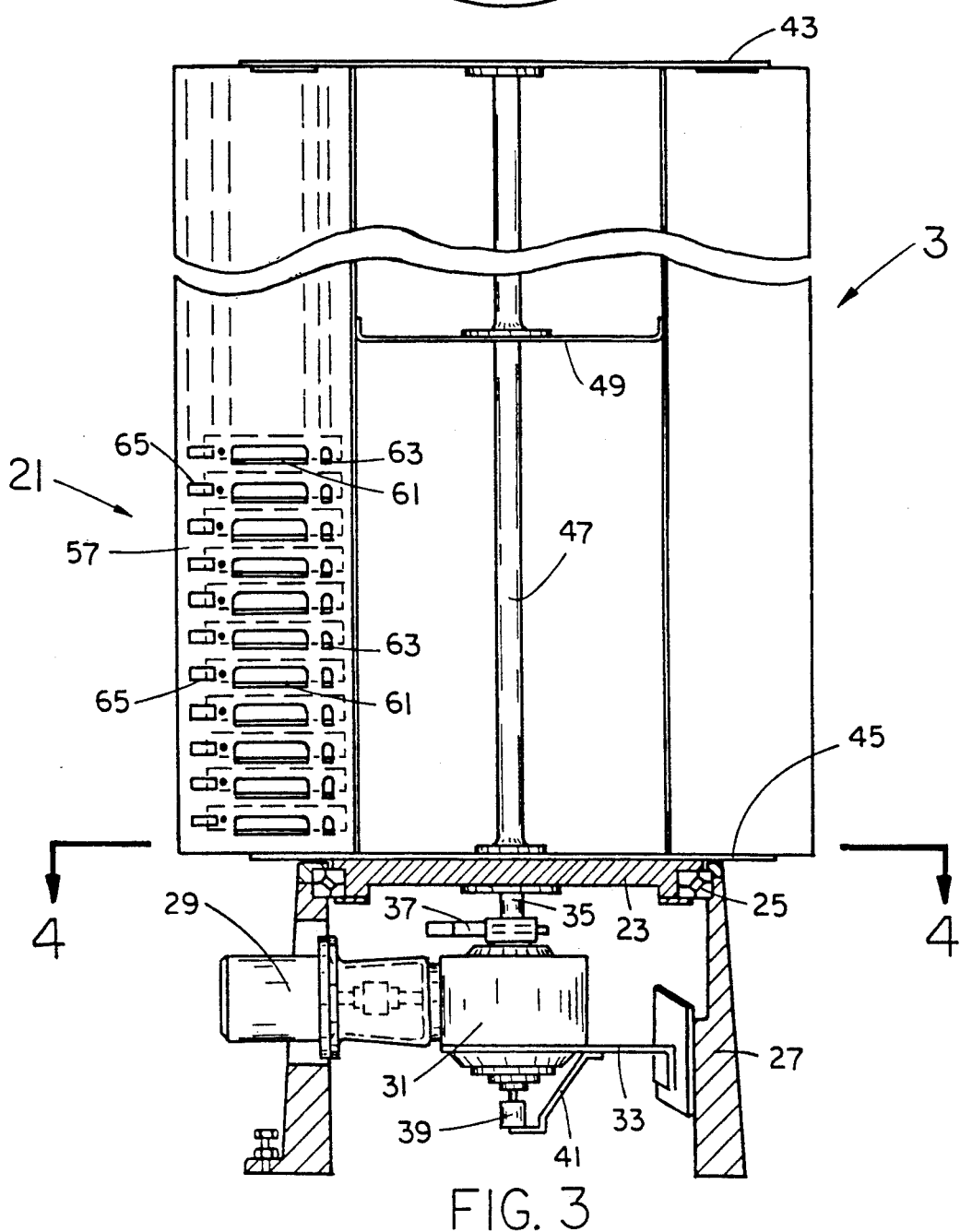
FIG. 3 is a fragmentary front elevational view, partly in section, illustrating the rotary cassette carousel used in the video cassette library retrieval and sequencing system shown in FIG. 1.

Each of the vertically directed strut members are clamped between upper and lower plates 43, 45 respectively, the lower plate 45 resting upon the rotary drive plate 23 as shown in FIG. 3. A drive shaft extension 47 extends between the upper and lower plates 43, 45 and includes a horizontally extending internal supporting frame element 49 which is suitably attached to the vertically directed strut members 21 in order to provide a unitary and connected structure for the rotary cassette carousel 3.

Figure 5:
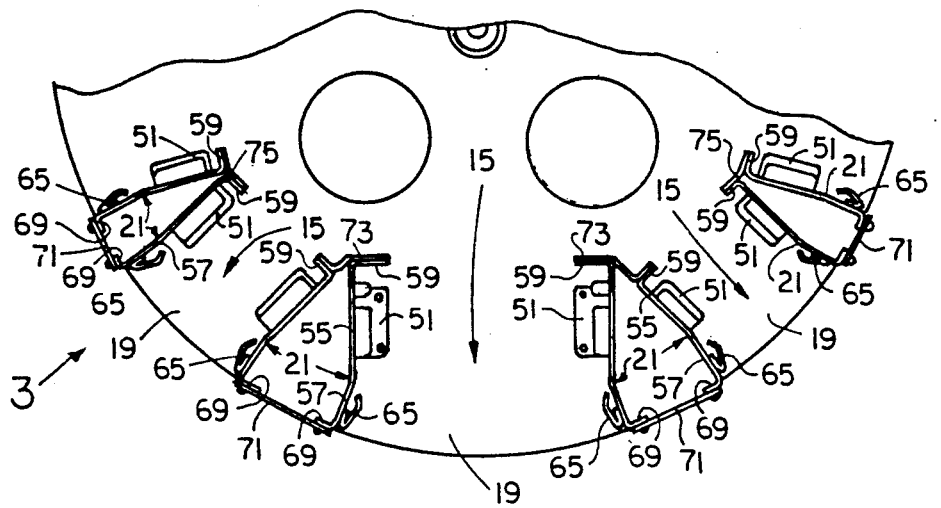
FIG. 5 is an enlarged fragmentary top plan view of the rotary cassette carousel, showing the construction of a variety of cassette pockets in adjacent columns, some of which accommodate cassettes of different size and type.
Figure 6:
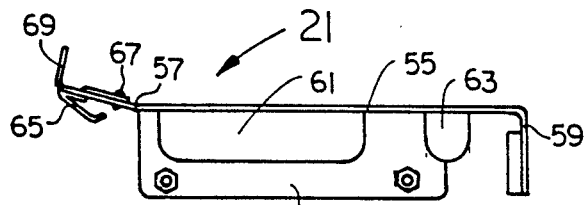
FIG. 6 is an enlarged fragmentary top plan view of one of the strut members is used to form a cassette pocket for supporting, guiding, and releasably retaining cassettes therein.
Figure 7:
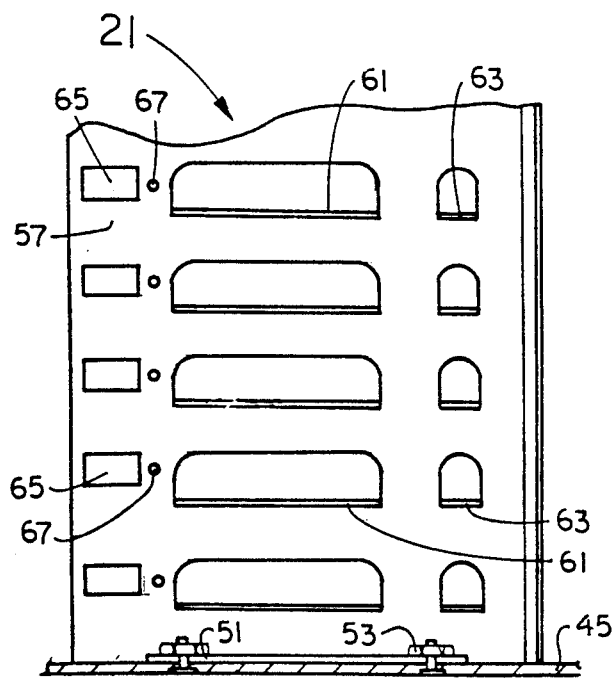
FIG. 7 is a fragmentary side elevational view, partly in section, of one of the strut members used to form the cassette pockets in the rotary cassette carousel.
Figure 8:
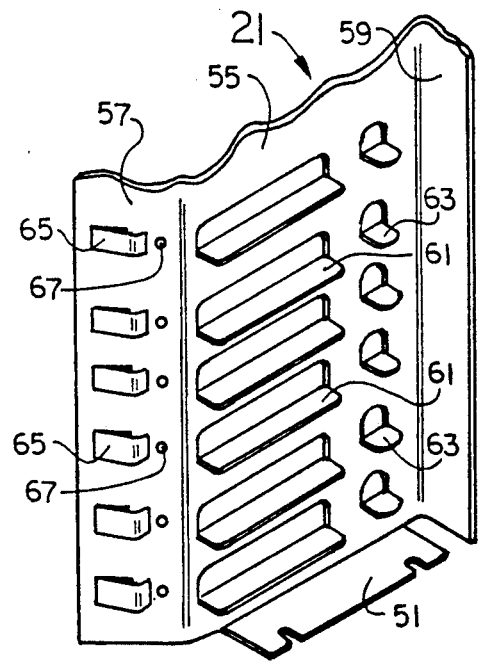
FIG. 8 is a fragmentary isometric view of one of the vertically directed strut members used for horizontally supporting, guiding and releasable retaining cassettes within the carousel.
Figure 11:
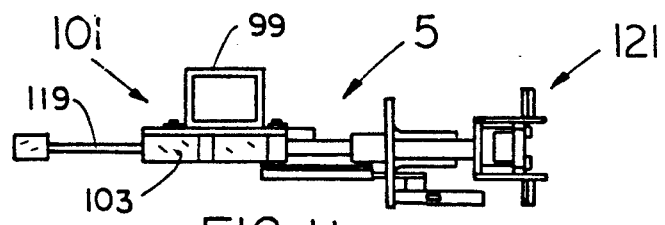
FIG. 11 is a top plan view of the multi-axis cassette transfer robot shown n FIG. 9.

The construction and arrangement of the generally vertically directed strut members 21 is best seen in FIGS. 5-8 of the drawings. Each of the generally vertically directed strut members 21 have upper and lower flanged foot sections 51, 51 which are attached to the upper and lower supporting plates 43, 45. As shown in FIG. 7 of the drawings, the lower supporting plate 45 has the flanged foot section 51 attached thereto by way of the threaded fasteners 53. Each of the generally vertically directed strut members 21 are bent, shaped and constructed for guiding, supporting and releasably retaining cassettes 17 within the cassette pockets 15. The cassette pockets 15 are formed by cooperating pairs of generally vertically directed struts 21 arranged, as shown in FIG. 5 of the drawings, for the guiding, supporting and retention of cassettes 17.

Each of the generally vertically directed strut members 21 have an intermediate flat body section 55 with an outwardly tapering guiding portion 57 at one end and a generally transversely directed portion 59 attached to the other end of flat body section 55. Extending from the flat body section 55 and spaced vertically from one another are a plurality of horizontally extending supporting sections or tabs 61, 63 which are co-planar with one another and are integrally connected to the flat body section 55 of the strut members 21. These horizontally extending supporting sections 61, 63 provide horizontal support on opposite sides of the cassette pocket 15 when cassettes 17 are inserted therein. The use of spaced supporting sections of tabs 61, 63 in each strut member 21 provides horizontal support for the cassettes without weakening the flat body section 55.

The generally outwardly tapering guide portions 57 has a spring detent 65 attached by a rivet 67 or the like thereto. The spring detent 65 extends inwardly relative to the cassette pocket 15 on opposite sides thereof in order to releasably engage and retain cassettes 17 inserted to the open mouth 19 of the cassette pockets 15. Thus, the spring detents 65 cooperate with the guiding portions 57 in each strut member 21 for assisting in guiding cassettes 17 and releasably retaining the cassettes 17 within the cassette pockets 15 when inserted therein.

At the outer free end of the guide portions 57, a circumferentially extending surface portion 69 is provided. As best seen in FIG. 5 of the drawings, adjacent non-cooperating strut members 21, 21 have circumferentially extending surface portions 69, 69 over which a facia covering 71 is mounted for structural and ornamental purposes.

The rotary cassette carousel 3 is capable of being used with a variety of different types and sizes of video cassettes. Thus, as shown in FIG. 5 of the drawings, the cassette pockets 15 in adjacent vertical columns of cassette pockets have a different dimension, with the cassette pockets in every other vertical column having the same dimension. Other arrangements are possible including cassette pockets in adjacent vertical columns having the same dimension, or a non-uniform arrangement of vertical columns, some having the same and some having another dimension. Where different sized cassette pockets are used in the same rotary cassette carousel 3, the construction arrangement and configuration of the vertically strut members 21 are essentially the same, except with respect to their size and the configuration of the stop surface portions 59. As will be understood, the stop portions 59 in adjacent non-similar cassette pockets 15 have a differently configured element 73 which is complementary configured relative to the stop surface portions 59, of the larger vertically directed strut members 21 in adjacent different-sized cassette pockets 15. Where the cassette pockets in adjacent columns have the same dimension, the similarly shaped vertically directed strut members 21, at the opposite sides of FIG. 5, shows a slightly concave-shaped element 75 which is attached to the stop surface portions 59 of adjacent vertically directed strut members 21.

Since the cassettes 17 are mounted within the cassette pockets 15 where the guiding, supporting and releasably retention means engage the cassettes 17 along and adjacent opposite side surfaces of the cassettes 17, the top and bottom surfaces of the cassettes 17 are exposed to facilitate insertion and removal of a cassette 17 relative to the cassette pocket 15, such as by the multi-axis cassette transfer robot 5, now to be described.

Figure 9:
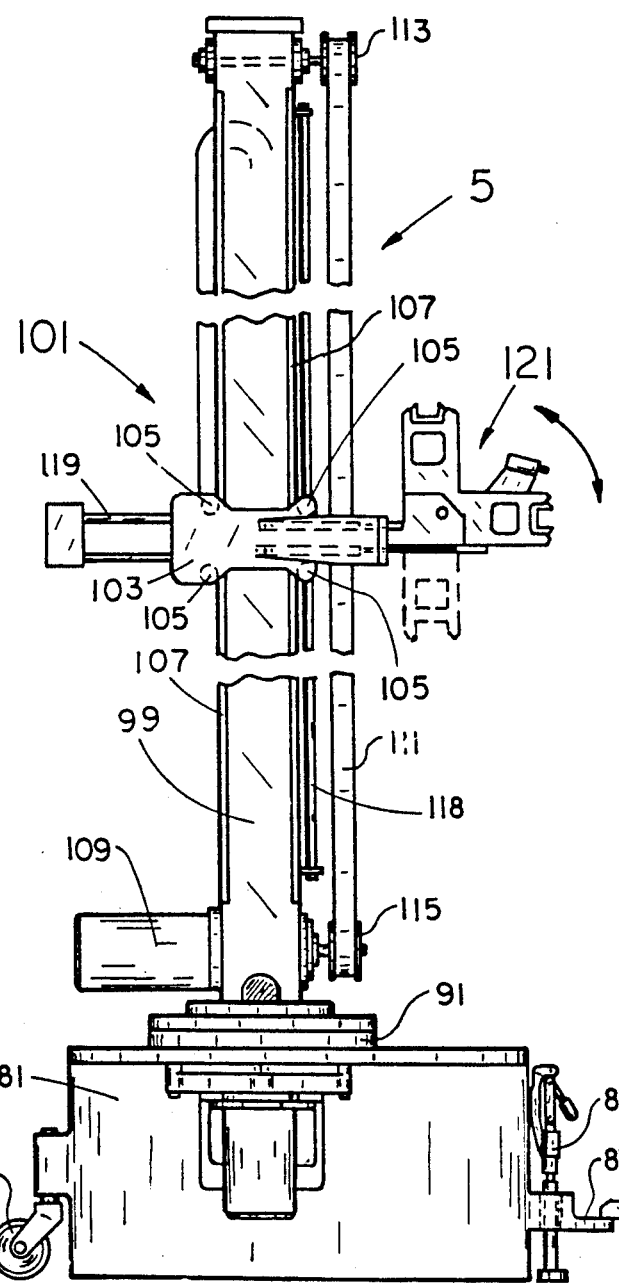
FIG. 9 is a top elevational view, partly in section, illustrating the multi-axis cassette transfer robot with cassette transfer arm and associated cassette gripper elements used in the system of FIG. 1.
Figure 10:
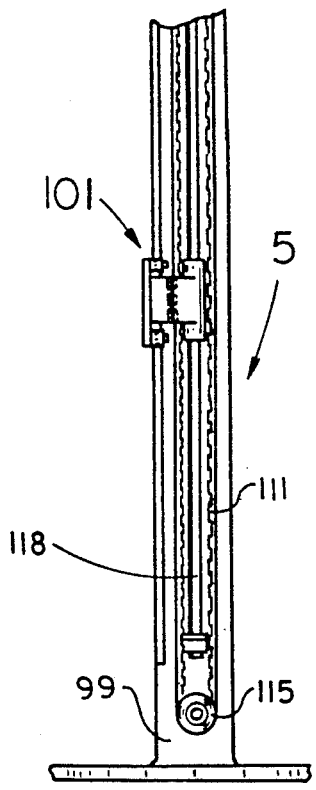
FIG. 10 is a fragmentary side elevational view illustrating the drive means for the transfer carriage mounted on the multi-axis cassette transfer robot of FIG. 9.
Figure 13:
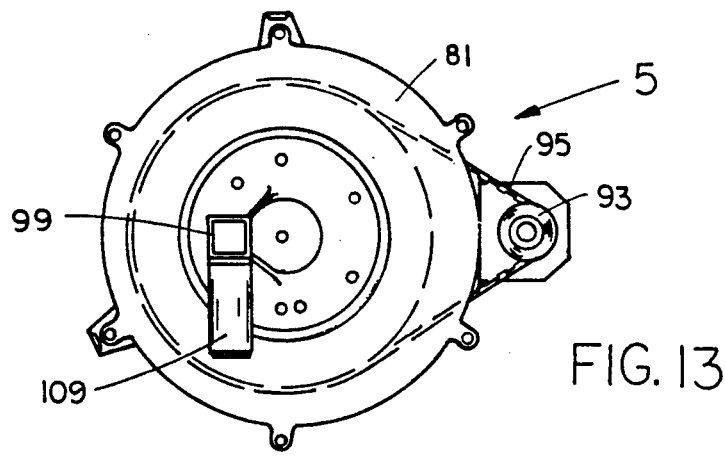
FIG. 13 is a top plan view of the multi-axis cassette transfer robot as viewed along lines 13—13 of FIG. 12.

The multi-axis cassette transfer robot 5 includes a supporting base 81 having wheels 83 attached to a lower end thereof and further including extendable locking legs 85 for fixedly mounting the base 81 to a floor surface. The extendably locking legs 85 include an outwardly projecting flange 87 which is adapted to be captured by a floor mounted hold down device 89 to securely lock the robot 5 in a fixed position, as best seen in FIG. 9.

The robot 5 has a rotating drive plate 91 which is supported by a zero clearance cross roller bearing (not shown) that is, in turn, supported by the robot base 81. The drive plate 91 is driven by a direct current servo motor 93 through a tooth (timing) belt and pulley drive arrangement 95 which engages corresponding elements of the drive plate, such as through a cog track drive or the like. An angular position sensor 97 is positioned adjacent the drive plate 91 to determine the position of the rotating drive plate 91 at various orientations thereof.

The robot 5 further includes a rigid square-shaped vertical column 99 which is attached at its lower end to the rotatable drive plate 91. The column 99 serves as the upper body portion of the robot 5 which is capable of 360° rotation about the drive plate 91, sometimes referred to as the "waist" of the robot 5. A cassette transfer carriage 101 is mounted for movement in a vertical path on the column 99. Specifically, the cassette transfer carriage 101 comprises a roller mounted vertical carriage 103 having rollers 105 which are guided along the vertical path by the hardened steel guides 107 attached to the vertical column 99. The cassette transfer carriage 101 is powered by a direct current servo motor 109 attached to the vertical column 9 which drives a tooth (timing) belt 111 over upper and lower pulleys 113, 115 attached to the vertical column 99 as best shown in FIG. 9. The cassette transfer carriage 101 is moved in the vertical path by the tooth timing belt 111 through the attachment of the cassette transfer carriage 103 thereto. An angular position sensor 117 is mounted to the cassette transfer carriage 103 and is coupled to a single position sensor mounted on the vertical column 99 in order to establish a reference location. A fluid counterbalance cylinder 118, preferably a pneumatic counterbalance cylinder is mounted to the vertical column 99 and provides a constant pre-set vertical pressure to the cassette transfer carriage 101, to overcome some of the gravitational forces created by the weight of the cassette transfer carriage 101, to thereby reduce the torque f the servo moter 109 which drives the cassette transfer carriage 101.

Figure 12:
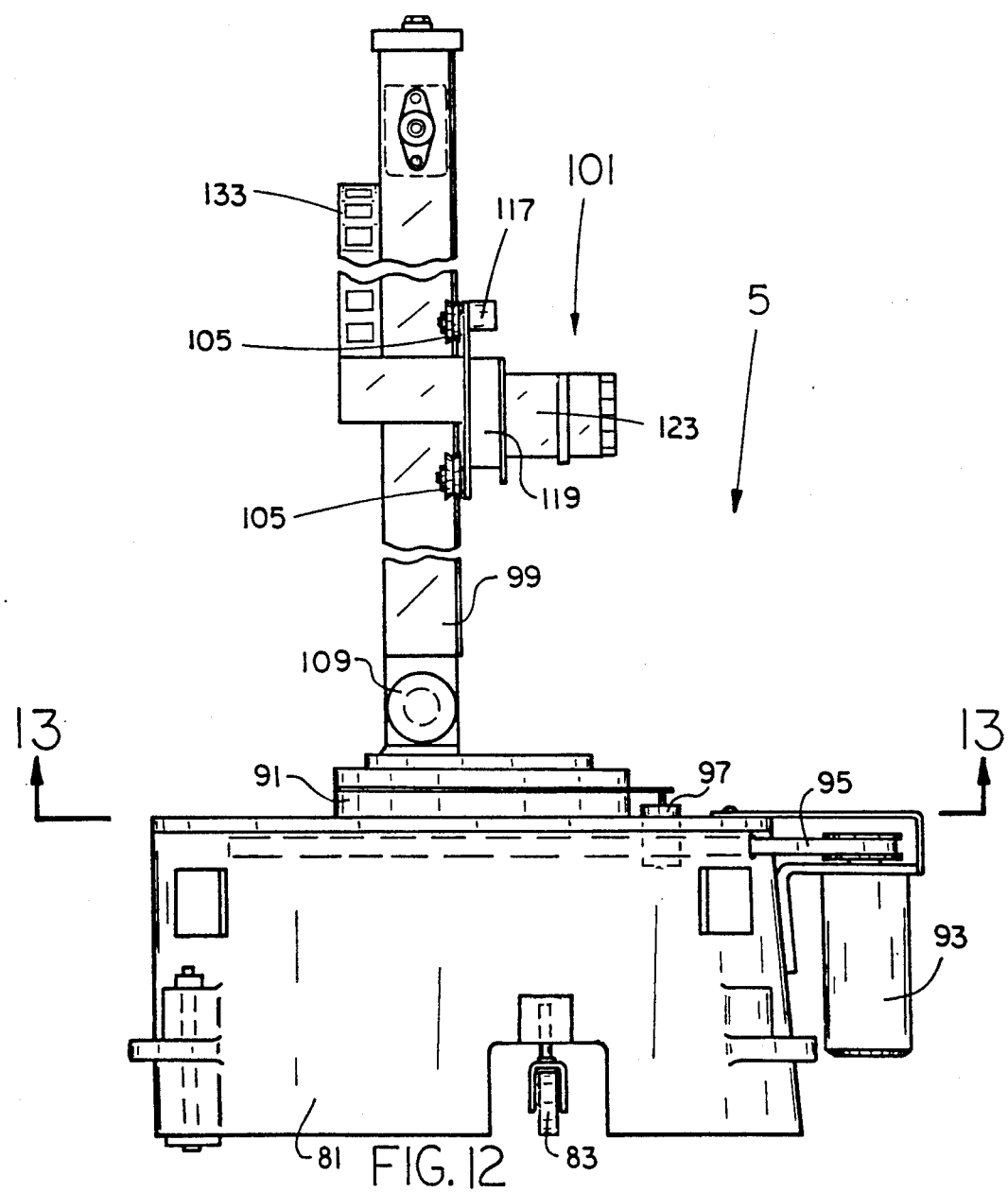
FIG. 12 is a rear elevational view, partly in section, of the multi-axis cassette transfer robot shown in FIGS. 9-11 of the drawings.

The cassette transfer carriage 101 carries a powered horizontal motion slide 119, which forms the cassette transfer arm and supports two offset gripper elements generally identified at 121 extending from the free end thereof. The slide 119 carries pneumatic valves, terminal strips, sensors, connectors, flow controls and the drive means for the angularly offset cassette gripper elements 121. All of these aforementioned controls are generally identified in the drawing as at 123 in FIG. 12. To assist in operating the slide 119 and to determine its particular location at any reference point, the slide 119 is further provided with hydraulic dampeners and position sensors (not shown). The slide 119 thus enables the angularly offset cassette gripper elements 121 to be moved in a horizontal path by the cassette transfer slide 119, as the cassette transfer carriage 101 is moved in a vertical path on the vertical column 99, the latter itself being rotated by the rotating drive plate 91, all as set forth above.

Figure 14:
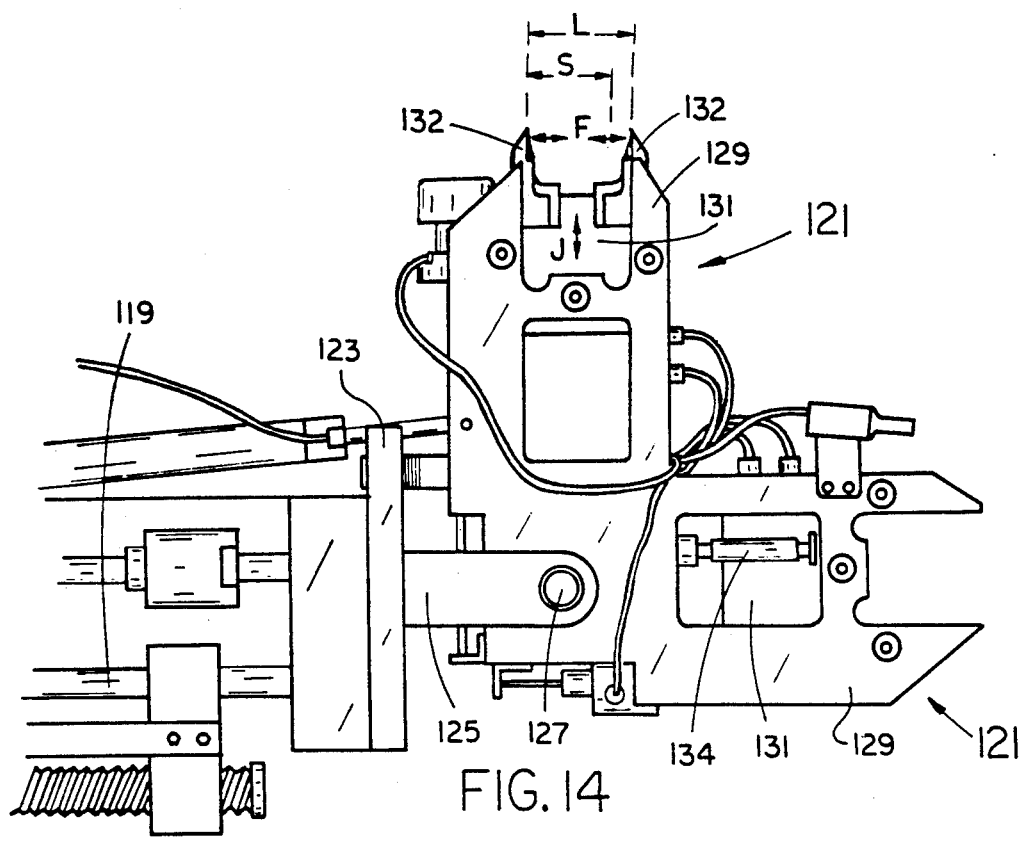
FIG. 14 is a side elevation view of the multi-axis cassette transfer arm and associated cassette gripper elements which are used with the multi-axis cassette transfer robot.
Figure 15:
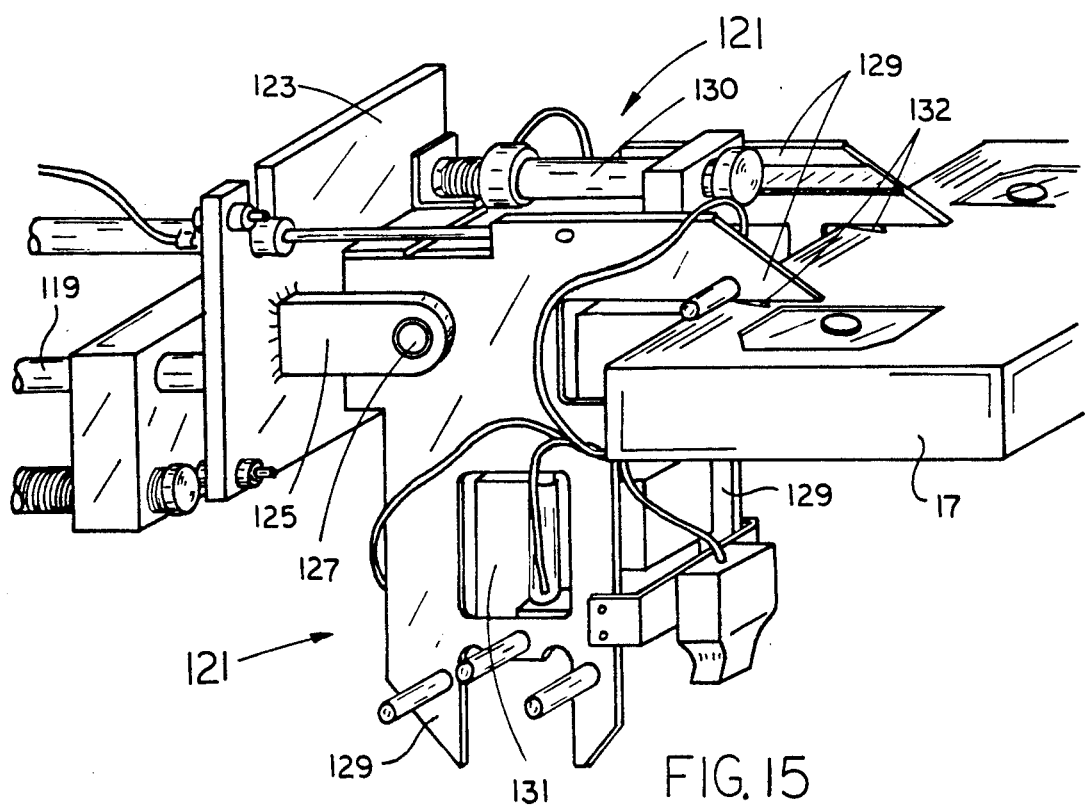
FIG. 15 is a fragmentary isometric view illustrating the multi-axis cassette transfer arm and associated cassette gripper elements as they are used in gripping a cassette for subsequent operations.

As best seen in FIGS. 14-15 of the drawings, the angularly offset cassette gripper elements are attached to a base plate 123 at the free end of the horizontal slide 119. Extending outwardly from the base plate 123 are shaft supports 125 which rotatably mount the shaft 127 to allow the angularly offset cassette gripper elements 121 to be rotatably and pivotally mounted for movement on the shaft 127 along a predetermined arcuate path.

Each of the angularly offset cassette gripper elements 121 have spaced and opposed U-shaped frames 129, 129 into which are mounted independently operable cassette gripper jaws 131 for each cassette gripper element 121.

Each of the independently operable cassette gripper jaws 131 are activated by fluid cylinders, such as the pneumatic cylinder 130 shown in FIG. 15, for independent movement of each of the cassette gripper jaws 131, in extended and retracted movement relative to the U-shaped frame 129, as shown by the oppositely pointed arrow J in FIG. 14 of the drawings. At the free end of each of said cassette gripper jaws 131 are independently operable cassette gripper fingers 132, also operated by a fluid cylinder (not shown) within the cassette gripper jaws 131, for closing and opening movement as represented by the oppositely pointed arrows F in FIG. 14, for gripping large and small cassettes, shown in phantom lines and represented by the letters L and S in FIG. 14. Thus, each of the cassette gripper jaws 131 for each cassette gripper element 121 is independently movable in opposite directions relative to its associated U-shape frame 129, as represented by the oppositely pointed arrow J, and further includes independently operable cassette gripper fingers 132, which open and close in opposite directions as represented by the oppositely pointed arrows F, for gripping large and small cassettes represented by the letters L and S. Also associated with each gripper element 121 is still another independently operable fluid cylinder 134 in FIG. 14 which may be operated to further assist in completely inserting a small cassette S into a video playback machine 7, if required.

Since the angular offset cassette gripper elements 121 are rotatably mounted about the common shaft 127, the cassette gripper elements 121 can be rotated by suitable fluid cylinders and the like to rotate the gripper elements 121 about the shaft 127 to facilitate cassette unloading with one of the cassette gripper elements 121 and cassette loading with the other cassette gripper element 121. Thus, it is possible to use the angularly offset (approximately 90° offset) cassette gripper elements 121 to load a cassette 17 from the carousel 3 into one of the U-shaped frames 129, through the use of the cassette gripper jaws 131 and cassette gripper fingers 132, then rotate the cassette gripper elements 121 to permit an "empty" cassette gripper element 121 to remove an ejected cassette from the video cassette station 7, and finally rotating the cassette gripper elements 121 again to permit the loaded cassette gripper element 121 to insert a fresh cassette into the video cassette machine at the video cassette station 7.

The multi-axis cassette transfer robot 5 thus has rotary movement of the column 99 about the drive plate 91, vertical path movement of the cassette transfer carriage 101 along the vertical column 99, horizontal movement of the cassette transfer carriage 101 along the horizontal slide 119, rotary movement of the angularly offset cassette gripper elements 121 about the shaft 127, limited extension and retraction movement of the gripper jaws 131, and limited opening and closing movement of the gripper fingers 132 for gripping and releasing cassettes 17. The independently operable cassette gripper jaws 131 accommodate different size cassettes such as large and small cassettes, land S, respectively, which may be used in the system 1. It will also be noted that flexible conduit 133 is used to guide and protect electrical cables and pneumatic lines extending from the vertical column 99 to the cassette transfer carriage 101, as shown in FIG. 1 and 20.

Referring now to the video cassette station 7, it will be noted as best seen in FIGS. 1 and 20 of the drawings that a plurality of video cassette playback machines 135 are vertically stacked above one another in alignment rails or racks 137 which have common locating surfaces relative to the multi-axis cassette transfer robot 5. Thus, the alignment racks or rails 137 will accept different video cassette playback machines 135, each of the machines 135 being pre-set within the alignment rails or racks 137 so that all the machines have common locating surfaces relative to the robot 5.

While the basic video cassette library, retrieval and sequencing system 1 includes at least one rotary cassette carousel 3, a multi-axis cassette transfer robot 5, at least one video cassette playback machine 135 and control means for operating the aforementioned components to transfer cassettes from the carousel 3 to the at least one video cassette playback machine 135 through the robot 5, there are circumstances which may require updating of the cassettes and/or last minute insertion of cassettes into the system 1. For this purpose, the mobile cassette storage rack 9 and related fixed rack station 11 may be used.

As best seen in FIG. 20, the mobile cassette storage rack 9 includes a cart 141 having wheels 143 mounted thereon for mobile positioning, and a cassette storage rack 145 superimposed on the cart 141. Handle 147 attached to the cart 141 may be used to position the mobile cassette storage rack 9 as desired. The cassette storage rack 145 has a plurality of cassette pockets and may be constructed in the same way utilizing corresponding vertically extending strut members similar to the vertically extending strut members 21 associated with the rotary cassette carousel 3.

The fixed rack station 11 associated with the mobile cassette storage rack 9 has spaced, upstanding legs 149, 149 which are mounted on floor platforms 151, 151. A removable bridge section 153 is releasably connected to the upper ends of the spaced legs 149, 149 in order that it can be quickly removed to allow removal of the robot 5 from the system 1, if desired.

In order to assemble the mobile cassette storage rack 9 in fixed position relative to the fixed rack station 11, complementary interfitting connections are provided. With reference to FIGS. 16-19 of the drawings, these complementary interfitting connections include horizontal guiding slot and lift bracket means 155 provided at the upper end of the mobile cassette storage rack 9 which receives complementary configured male plugs 157 depending from the fixed rack station 11. The enlarged heads 159, 159 of the male plugs 157, 157 are designed to be received within and below the horizontal guiding slot and lip bracket means 155, 155 on opposite sides of the mobile cassette storage rack 9 as best shown in FIG. 17 of the drawings. In addition, vertical guide elements 161 extending upwardly from the mobile cassette storage rack 9, as shown in FIGS. 16 and 18 of the drawings, are received within complementary openings formed in the upper bridge 153 of the fix rack station 11. The cassette storage rack 145 and the cart 141 may also have complementary interfitting connections 163, as shown in FIG. 19.

The fixed rack station 11 includes lifting means for positioning the cassette storage rack 145 and cart 141 relative to the fixed rack station 11, in order to accurately position the mobile cassette storage rack 9 in a predetermined location relative to the other components of the system 1. Specifically, the bridge section 153 includes pneumatically operated lift cylinders 165 on opposite sides thereof which are connected to the male plugs 157 for raising the male plugs 157 and the mobile cassette rack 145, through the complementary interfitting connection of the horizontal guiding slot and lift bracket means 155. The lift cylinders 165 thus determine the specific height of the mobile cassette rack 145 in orienting the cassette storage rack 145 relative to a specific position within the fixed rack station 11 in order to be identified by sensors associated with multi-axis cassette transfer robot 5. The mobile cassette storage rack 9 may be arranged to permit the cassette storage rack 145 thereof to be lifted separately from or along with the cart portion 141 of the mobile cassette storage rack, when lifted by the pneumatically operated lift cylinders 165. Each of the upstanding legs 149, 149 of the fixed rack station 11 have a common air passageway 167 with the bridge section 153 in order to allow air to be supplied through the legs 149 to pneumatically operate the lift cylinders 165 within the bridge section 153.

It will be noted that the bridge section 153 also carries a small rack section 169 in order to provide one or more "hot slot" cassette pockets for the last minute insertion of cassette 17 in the system 1. Cassette updating through the cassette storage rack 145 and last minute cassette insertion through the small rack section 169 affords additional flexibility and adaptability of the mobile cassette storage rack 9 and associated fixed rack station 11 relative to the video cassette library, retrieval and sequencing system 1.

In the operation of the video cassette library, retrieval and sequencing system 1, the rotary cassette carousel 3, operated by a computer based programmable control system (not shown) presents a new cassette 17 to a specific position where the multi-axis cassette transfer robot 5 can pick up the cassette 17. The angularly offset cassette gripper elements 121 of the robot 5 remove the cassette 17 from the rotary cassette carousel 3, with the cassette gripper element 121 that is normally in the horizontal attitude, using the independently operable gripper jaWs 131 and gripper fingers 132, as previously discussed. The cassette gripper elements 121 are then rotated about the shaft 127 to position the empty cassette gripper elements 121 in the horizontal attitude. The robot 5 then rotates the vertical column 99 to rotate the cassette gripper elements 121 to the appropriate video tape machine 135. The empty cassette gripper element 121 is then operated to extend the independently operable gripper jaws 131 and gripper fingers 132 to grip and remove an ejected cassette 17 from the video cassette machine. When removed, the cassette gripper elements 121 are again rotated about the shaft 127 to position the new cassette to the insert position relative to the appropriate video cassette machine 135. The independently operable gripper jaws 131 associated with each cassette gripper element 121 extend and then insert the new cassette 17 into the appropriate video cassette playback machine 135, as the gripper fingers 132 release the cassette. While this is taking place, the rotary cassette carousel 3 rotates to present the appropriate empty cassette pocket 15 designated by the host computer for receiving the ejected and removed cassette 17. Following the insertion of the cassette 17 into the appropriate video cassette machine, the cassette gripper elements 121 again rotate about the shaft 127 in order to position the particular cassette gripper element 121 carrying the removed cassette 17 in the horizontal attitude for subsequent placement into the appropriate cassette pocket 15 designated by the host computer. Activation of the independently operable gripper jaws 131 associated with the cassette gripper element 121 carrying a removed cassette 17, together with release of the gripper fingers 132, will cause the removed cassette to be placed into the appropriate cassette pocket 15 designated by the host computer. The independently operable gripper jaws 131 and gripper fingers 132 are thereby released and the cassette gripper element 121 retracts from the rotary cassette carousel 3, completing the operation. Where a mobile cassette storage rack 9 and associated fixed rack station 11 are used in the system 1, the host computer may be programmed to remove new cassettes therefrom and also replace removed and ejected cassettes back into the mobile cassette storage rack 9, if desired.

From the foregoing, it will be appreciated that the present invention provides a new an improved video cassette library, retrieval and sequencing system for the storage, transfer, sequencing and playback of video cassettes. Each of the rotary cassette carousels 3 used have been used in the system 1 may carry a very substantial number of cassettes. In one example, at least 500 video cassettes have been carried by each carousel 3. Thus, a total of up to 1500 video cassettes have been used in the system 1 where three rotary cassette carousels are arranged in the system 1, as shown, for example, in FIG. 2 of the drawings. Of course, the carousels may be designed to hold even a larger number, if desired. Each of the mobile cassette storage racks can carry, for example, up to 50 additional video cassette in the cassette storage rack 145, and several additional cassettes in the "hot slot" cassette pockets of the small rack section 169 carried on the bridge section 153 of the fixed rack station 11. The speed and efficiency of the video cassette library, retrieval and sequencing system 1 is such that it is designed to preform the longest carousel to video cassette machine transfer distance in approximately 12 seconds, depending upon video cassette format. Accordingly, the speed and efficiency of the system, its flexibility and adaptability to meet different requirements and changing needs, the substantial storage capacity of the system, and the many other features and advantages set forth above, greatly facilitates regular television and "spot" broadcasting, thereby freeing broadcast station employees for other tasks, as may be appropriate.

In view of the above, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

I claim:

1. A free standing rotary cassette carousel having a modular construction including a series of generally vertically directed strut members supported between upper and lower generally horizontally extending plates, each of said upper and lower plates having an outer circular periphery, said strut members being circumferentially spaced from each other in a predetermined arrangement about the circular periphery of said upper and lower plates, said strut members being formed to provide a plurality of cassette pockets arranged in a series of vertical columns and horizontal rows, and said strut members capable of being rearranged in various predetermined arrangements around the circular periphery of said upper and lower plates to enlarge or reduce the cassette pockets in order to accommodate larger or smaller cassettes as desired.

2. The rotary cassette carousel as defined in claim 1 wherein each adjacent pair of strut members are formed to provide each cassette pocket with horizontally extending supporting means, angularly offset guide means and circumferentially disposed retention means for horizontally supporting, guiding and retaining cassettes inserted into the open mouth of each cassette pocket.

3. The rotary cassette carousel as defined in claim 2 wherein cassette pockets in adjacent vertical columns have the same dimension.

4. The rotary cassette carousel as defined in claim 3 wherein cassette pockets in at least some adjacent vertical columns have different dimensions.

5. The rotary cassette carousel as defined in claim 2 wherein cassette pockets in adjacent vertical columns have a different dimension, and cassette pockets in every other vertical column have the same dimension.

6. The rotary cassette carousel as defined in claim 2 wherein said guiding, supporting and releasably retention means have limited engagement with cassettes to facilitate insertion and removal of cassettes relative to said cassette pockets.

7. The rotary cassette carousel as defined in claim 6 wherein said guiding, supporting and releasably retention means engage cassettes along and adjacent to opposite side surfaces thereof to permit exposure to the top and bottom of said cassettes.

8. A free standing rotary cassette carousel having a modular construction including a series of generally vertically directed strut members supported between upper and lower plates, each of said plates having an outer circular periphery, said strut members being circumferentially spaced from each other about the circular periphery of said plates in a variety of predetermined arrangements, adjacent strut members including a plurality of cassette pockets each having a circumferentially disposed open mouth and being arranged in a series of vertical columns and horizontal rows, said cassette pockets being formed by said cooperating pairs of generally vertically directed strut members to provide vertically aligned cassette pockets in each cooperating pair of strut members and horizontally aligned pockets in circumferentially adjacent cooperating pairs of strut members, each of said cooperating pairs of strut members providing each cassette pocket with cooperating generally horizontally extending supporting means, angularly offset guide means and circumferentially disposed retention means for horizontally supporting, guiding and retaining cassettes inserted into the open mouth of each cassette pocket.

9. The rotary cassette carousel as defined in claim 8 wherein said circumferentially disposed retention means comprise resilient retention fingers extending from each pair of cooperating strut members for each cassette pocket to facilitate releasably engagement of cassettes inserted into each cassette pocket.

10. The rotary cassette carousel as defined in claim 9 wherein said resilient retention fingers are proximately mounted relative to said angularly offset guide portions for cooperative association therewith.

11. The rotary cassette carousel as defined in claim 8 wherein the horizontally extending supporting means for each strut member have a limited predetermined dimension for underlying only part of a cassette inserted in the cassette pocket to facilitate insertion and withdrawal of cassettes therein.

12. The rotary cassette carousel as defined in claim 8 wherein said generally horizontally extending supporting means includes first and second spaced co-planar supporting sections integrally connected to each strut member and providing horizontal support for said cassettes when said generally horizontally extending supporting sections of cooperating pairs of strut members underlie said cassettes on opposite sides thereof.

13. The rotary cassette carousel as defined in claim 8 wherein said angularly offset guide means includes integral angularly outwardly offset portions of each strut member adjacent to the open mouth of each cassette pocket.

14. The rotary cassette carousel as defined in claim 8 wherein each strut member opposite the open mouth of each cassette pocket includes a stop portion to limit the amount of insertion into each cassette pocket.

15. The rotary cassette carousel as defined in claim 8 wherein adjacent non-cooperating strut members have circumferentially extending surfaces over which a facia covering is mounted.

16. A rotary cassette carousel including a plurality of cassette pockets each having a circumferentially disposed open mouth and being arranged in a series of vertical columns and horizontal rows, said cassette pockets being formed by a plurality of cooperating pairs of generally vertically directed strut members mounted to said carousel to provide vertically aligned cassette pockets in each cooperating pair of strut members and horizontally aligned pockets in circumferentially adjacent cooperating pairs of strut members, each of said cooperating pairs of strut members providing each cassette pocket with cooperating generally horizontally extending supporting means, angularly offset guide means and circumferentially disposed retention means for horizontally supporting, guiding and retaining cassettes inserted into the open mouth of each cassette pocket, said plurality of cooperating pairs of strut members being mounted on a base drive plate, a drive shaft connecting said drive plate to drive means positioned below said drive plate, said drive means including a direct current servo motor coupled to transmission means, a hollow shaft extending from said transmission means and receiving said drive shaft, and quick disconnect means for disconnecting the hollow shaft from the drive shaft.

17. The rotary cassette carousel as defined in claim 16 including angular position sensor means for sensing the angular position of the carousel and control means for stopping and starting the direct current servo motor for predetermined orientation and positioning of specific cassette pockets relative to particular location.

* * * * *